United States Patent
Hu et al.

(10) Patent No.: US 12,242,006 B2
(45) Date of Patent: Mar. 4, 2025

(54) SIMULTANEOUS SHOOTING TIME-LAPSE SEISMIC DATA DEBLENDING FOR CO2 MONITORING AND TIME LAPSE SIMULTANEOUS SHOOTING SCHEME RECOMMENDER

(71) Applicant: Schlumberger Technology Corporation, Sugar Land, TX (US)

(72) Inventors: Wenyi Hu, Fulshear, TX (US); Aria Abubakar, Sugar Land, TX (US); Haibin Di, Houston, TX (US); Zhun Li, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/687,068

(22) PCT Filed: Aug. 29, 2022

(86) PCT No.: PCT/US2022/075593
§ 371 (c)(1),
(2) Date: Feb. 27, 2024

(87) PCT Pub. No.: WO2023/028617
PCT Pub. Date: Mar. 2, 2023

(65) Prior Publication Data
US 2024/0272322 A1  Aug. 15, 2024

Related U.S. Application Data

(60) Provisional application No. 63/260,628, filed on Aug. 27, 2021.

(51) Int. Cl.
*G01V 1/28* (2006.01)

(52) U.S. Cl.
CPC .................... *G01V 1/282* (2013.01)

(58) Field of Classification Search
CPC .......... G01V 1/282; G01V 1/36; G01V 1/364; G01V 1/6808; G01V 1/32; G01V 1/3861;
(Continued)

(56) References Cited

U.S. PATENT DOCUMENTS 11,105,942 B2 * 8/2021 Alwon ................... G01V 1/364
11,327,196 B2 * 5/2022 van Groenestijn ...... G01V 1/32
(Continued)

OTHER PUBLICATIONS

Search Report and Written Opinion of International Patent Application No. PCT/US2022/075593 dated Nov. 8, 2022, 10 pages.
(Continued)

*Primary Examiner* — Shelby A Turner
*Assistant Examiner* — Yaritza H Perez Bermudez
(74) *Attorney, Agent, or Firm* — Jeffrey D. Frantz

(57) ABSTRACT

Systems, computer-readable media, and methods are provided. Blended baseline data is generated by numerically blending unblended baseline data according to a simultaneous shooting schedule scheme. Pseudo-deblended baseline seismic data is generated by applying a pseudo-deblending procedure to the blended baseline data. Machine learning labels are generated from common gathers of the pseudo-deblended baseline data and the unblended baseline data. A neural network is trained using the labels, the common gathers of the pseudo-deblended baseline data, and the unblended baseline data to produce common gathers of deblended baseline seismic data from the common gathers of the pseudo-deblended baseline seismic data.

20 Claims, 16 Drawing Sheets

(58) Field of Classification Search
CPC ......... G01V 2210/20; G01V 2210/121; G01V 2210/125; G01V 2210/127; G01V 2210/1293; G01V 2210/1423; G01V 2210/3246; G01V 2210/38; G01V 2210/56; G01V 2210/57; G06F 18/214; G06F 2218/04; G06N 3/045; G06N 3/08; G06N 3/084
See application file for complete search history.

(56) References Cited

U.S. PATENT DOCUMENTS

| | | | |
|---|---|---|---|
| 11,460,594 B1* | 10/2022 | Iqbal | G01V 1/30 |
| 11,536,867 B2* | 12/2022 | Hegge | G01V 1/282 |
| 2016/0177715 A1* | 6/2016 | Indo | G01N 21/359 |
| | | | 166/250.16 |
| 2017/0002630 A1* | 1/2017 | Priezzhev | E21B 43/12 |
| 2019/0094401 A1 | 3/2019 | van Groenestijn | |
| 2020/0271805 A1* | 8/2020 | Hegge | G01V 1/36 |
| 2021/0033740 A1* | 2/2021 | Hegge | G01V 1/364 |

OTHER PUBLICATIONS

Wang, S et al.—"A physics-augmented deep learning method for seismic data deblending"—Society of Exploration Geophysicist, Sep. 30, 2020, 5 pages.

* cited by examiner

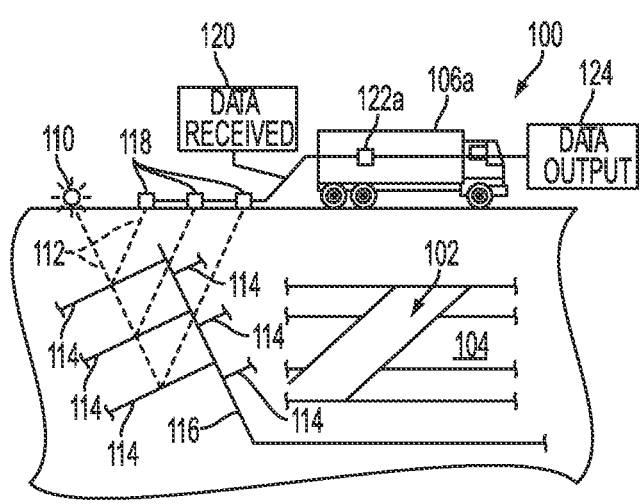
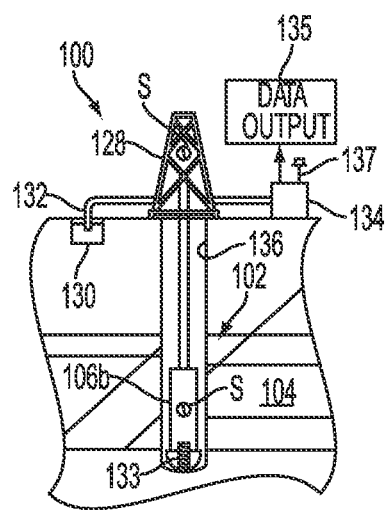
FIG. 1A  FIG. 1B
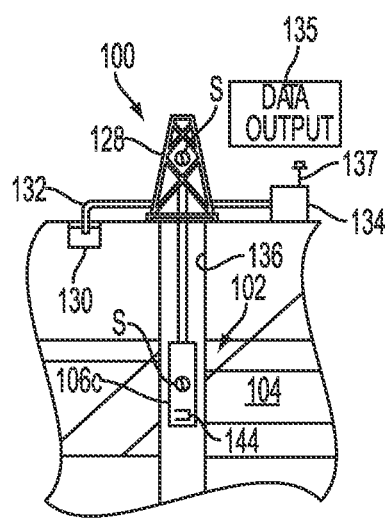
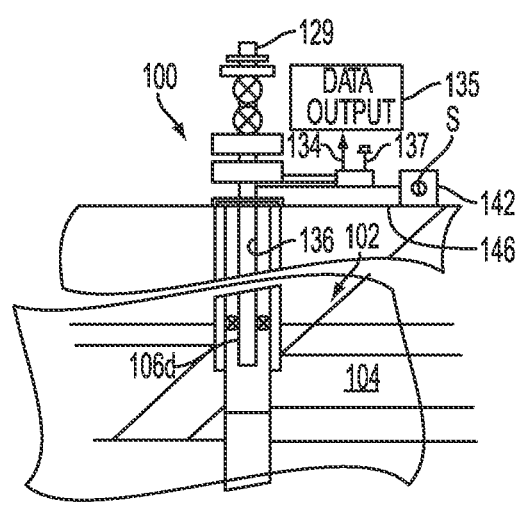
FIG. 1C  FIG. 1D

SIMULTANEOUS SHOOTING TIME-LAPSE SEISMIC DATA DEBLENDING FOR CO2 MONITORING AND TIME LAPSE SIMULTANEOUS SHOOTING SCHEME RECOMMENDER

CROSS-REFERENCE TO RELATED APPLICATIONS

This application is a National Stage Entry of International Application No. PCT/US2022/075593, filed Aug. 29, 2022, which claims priority to U.S. Provisional Patent Application Ser. No. 63/260,628, which was filed on Aug. 27, 2021. The entirety of this provisional application is incorporated herein by reference.

BACKGROUND 4D time lapse seismic data are important for reservoir monitoring, CO2 injection and storage monitoring, enhanced oil recovery (EOR) monitoring, and other applications. Sequential shooting technology is currently used to perform seismic surveys. When using sequential shooting technology, a cycle is performed that includes firing a shot, collecting data after the firing, and waiting a period of time, during which effects of the shot fade out. The cycle is then repeated for a next shot. As a result, sequential shooting technology can be time consuming and tie up manpower and equipment resources for a relatively long amount of time. A more efficient way to conduct a survey is needed.

SUMMARY

Embodiments of the present disclosure may provide a method for deblending of simultaneous source monitoring of seismic data in a time lapse seismic application. A computing device acquires unblended baseline seismic data. Blended baseline seismic data is generated by numerically blending the unblended baseline seismic data according to a simultaneous shooting schedule scheme. Pseudo-deblended baseline seismic data is generated by applying a pseudo-deblending procedure to the blended baseline seismic data. Labels for machine learning are generated from common gathers of the pseudo-deblended baseline seismic data and common gathers of the acquired unblended baseline seismic data. A neural network is trained using the labels, the common gathers of the pseudo-deblended baseline seismic data, and the common gathers of the acquired unblended baseline seismic data. The neural network is trained to produce common gathers of deblended seismic data from the common gathers of the pseudo-deblended baseline seismic data.

In an embodiment, the method may include for each one of a plurality of second simultaneous shooting schedule schemes: generating blended monitoring data by numerically blending acquired unblended monitoring data according to a respective one of the plurality of the second simultaneous shooting schedule schemes; generating pseudo-deblended monitoring data by applying the pseudo-deblending procedure to the blended monitoring data; generating common gathers of the deblended monitoring data by inputting common gathers of the pseudo-deblended monitoring data to a neural network trained to produce the common gathers of the deblended monitoring data based on the respective one of the plurality of the second simultaneous shooting schedule schemes; comparing the common gathers of the deblended monitoring data with common gathers of the unblended monitoring data to evaluate deblending accuracy of the neural network. One of the multiple second simultaneous shooting schedule schemes is recommended based on accuracy and acquisition time.

In an embodiment, the method may include preprocessing the unblended baseline seismic data to remove noise and to match a frequency spectrum of the baseline seismic data to that of the monitoring data.

In an embodiment, the method may include shifting data points of the baseline seismic data and the monitoring data to a nearest grid so that both the baseline seismic data and the monitoring data have a same source geometry and a same receiver geometry.

In an embodiment, the method may include acquiring blended monitoring data blended according to the simultaneous shooting scheme; generating pseudo-deblended monitoring data by applying the pseudo-deblending procedure to the blended monitoring data; generating common gathers of first-stage deblended monitoring data by inputting common gathers of the pseudo-deblended monitoring data to the trained neural network. A second-stage neural network is trained to produce common gathers of second-stage deblended monitoring data from the common gathers of the first-stage deblended monitoring data.

In an embodiment, the method may include acquiring second monitoring data produced by the simultaneous shooting schedule scheme; generating pseudo-deblended second monitoring data by applying the pseudo-deblending procedure to the second monitoring data; and generating common gathers of second-stage deblended second monitoring data by inputting the common gathers of the first-stage deblended second monitoring data to the second-stage neural network, wherein the common gathers of the second-stage deblended second monitoring data are included in collected survey data.

Embodiments of the present disclosure may also provide a computing system that includes at least one processor and a memory including at least one non-transitory, computer-readable medium that stores instructions. When executed by at least one of the at least one processor, the computing system is caused to perform operations. The operations include acquiring blended monitoring data blended according to a simultaneous shooting schedule scheme; generating pseudo-deblended monitoring data by applying a pseudo-deblending procedure to the blended monitoring data; and generating common gathers of deblended monitoring data by inputting common gathers of the pseudo-deblended monitoring data to a neural network trained to produce the common gathers of the deblended monitoring data from the common gathers of the pseudo-deblended monitoring data produced from the blended monitoring data blended according to the simultaneous shooting schedule scheme.

Embodiments of the present disclosure may also provide a non-transitory computer-readable medium having instructions for at least one processor stored thereon such that, when the at least one processor executes the instructions, the at least one processor performs operations. The operations include acquiring unblended baseline seismic data is acquired; generating blended baseline seismic data by numerically blending the unblended baseline seismic data according to a simultaneous shooting schedule scheme; generating pseudo-deblended baseline seismic data by applying a pseudo-deblending procedure to the blended baseline seismic data; generating labels for machine learning from common gathers of the pseudo-deblended baseline seismic data and common gathers of the acquired unblended seismic data; and training a neural network using the labels, the common gathers of the pseudo-deblended baseline seismic data, and the common gathers of the acquired unblended baseline seismic data, wherein the neural network is trained to produce common gathers of deblended seismic data from the common gathers of the pseudo-deblended baseline seismic data.

Embodiments of the present disclosure may further provide a computing system that includes at least one means for processing instructions, and a non-transitory means for storing instructions that, when executed by at least one of the at least one means for processing cause operations to be performed by: acquiring unblended baseline seismic data; generating blended baseline seismic data by numerically blending the unblended baseline seismic data according to a simultaneous shooting schedule scheme; generating pseudo-deblended baseline seismic data by applying a pseudo-deblending procedure to the blended baseline seismic data; generating labels for machine learning from common gathers of the pseudo-deblended baseline seismic data and common gathers of the acquired unblended seismic data; and training a neural network using the labels, the common gathers of the pseudo-deblended baseline seismic data, and the common gathers of the acquired unblended baseline seismic data. The neural network being trained to produce common gathers of deblended seismic data from the common gathers of the pseudo-deblended baseline seismic data.

Embodiments of the present disclosure may further provide a computing system including at least one processor and a memory including at least one non-transitory, computer-readable medium that stores instructions. When the instructions are executed by at least one of the at least one processor, the at least one processor is configured to: acquire blended monitoring data; generate pseudo-deblended monitoring data by applying a pseudo-deblending procedure to the blended monitoring data; and generate common gathers of deblended monitoring data by inputting common gathers of the pseudo-deblended monitoring data to a neural network trained to produce the common gathers of the deblended monitoring data from the common gathers of the pseudo-deblended monitoring data produced from the blended monitoring data blended according to the simultaneous shooting schedule scheme.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
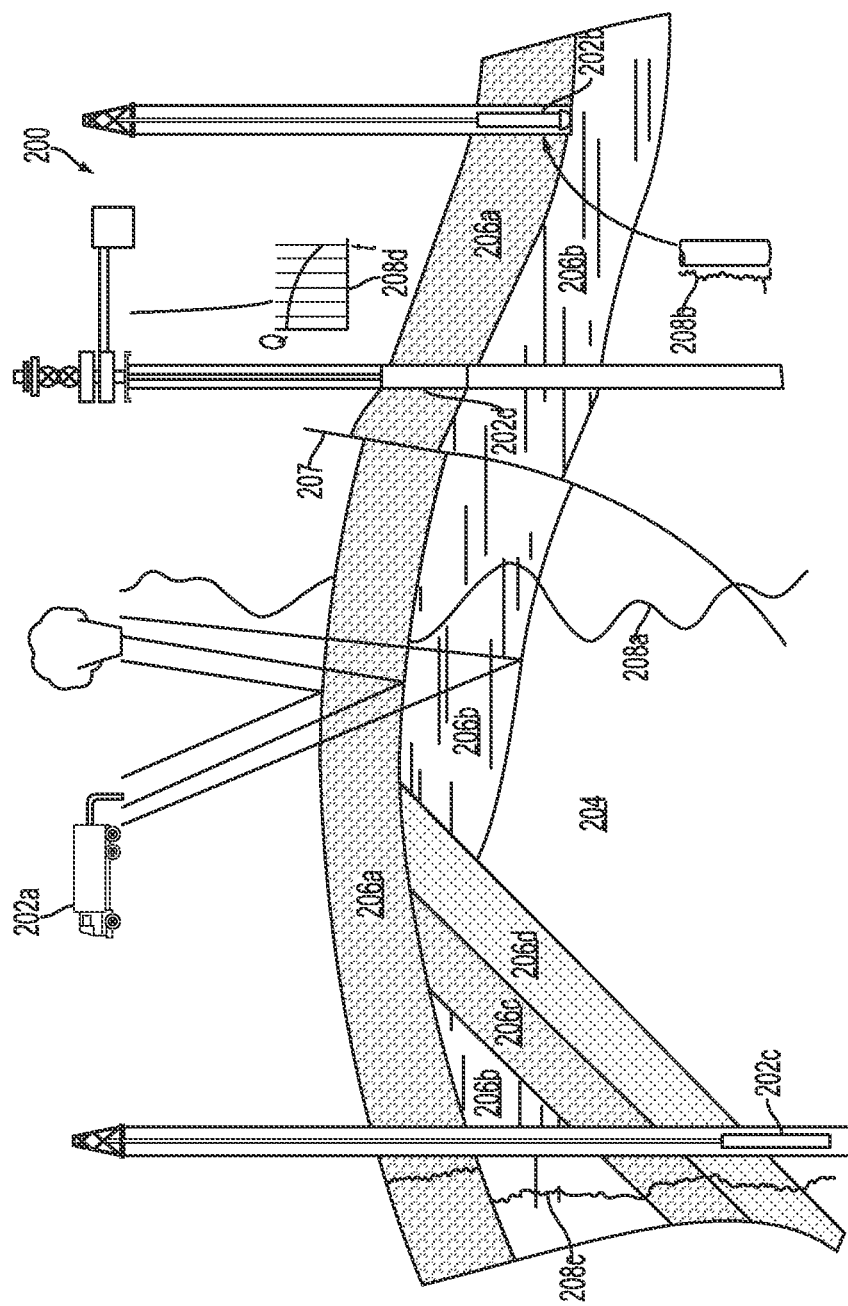

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 may communicate with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
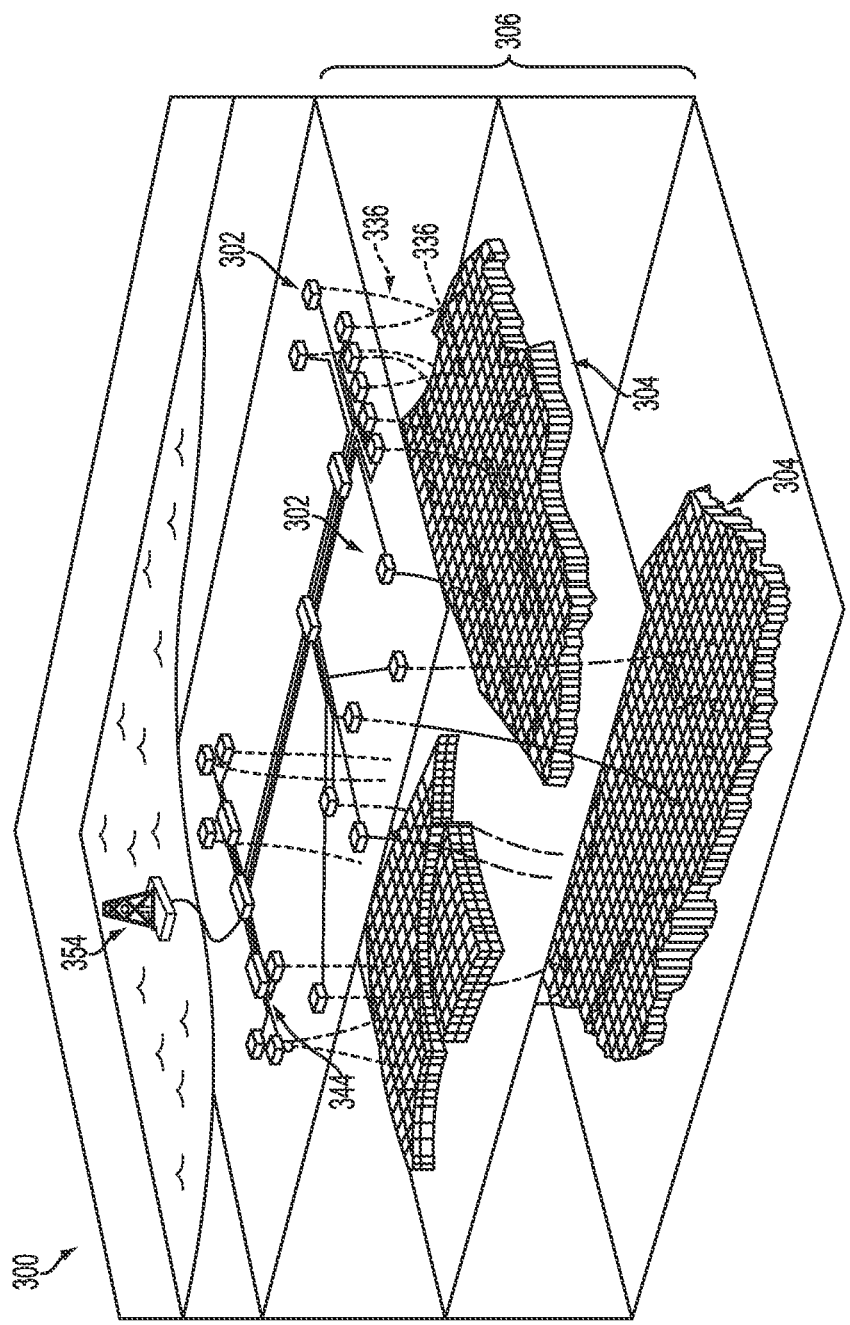

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the Earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
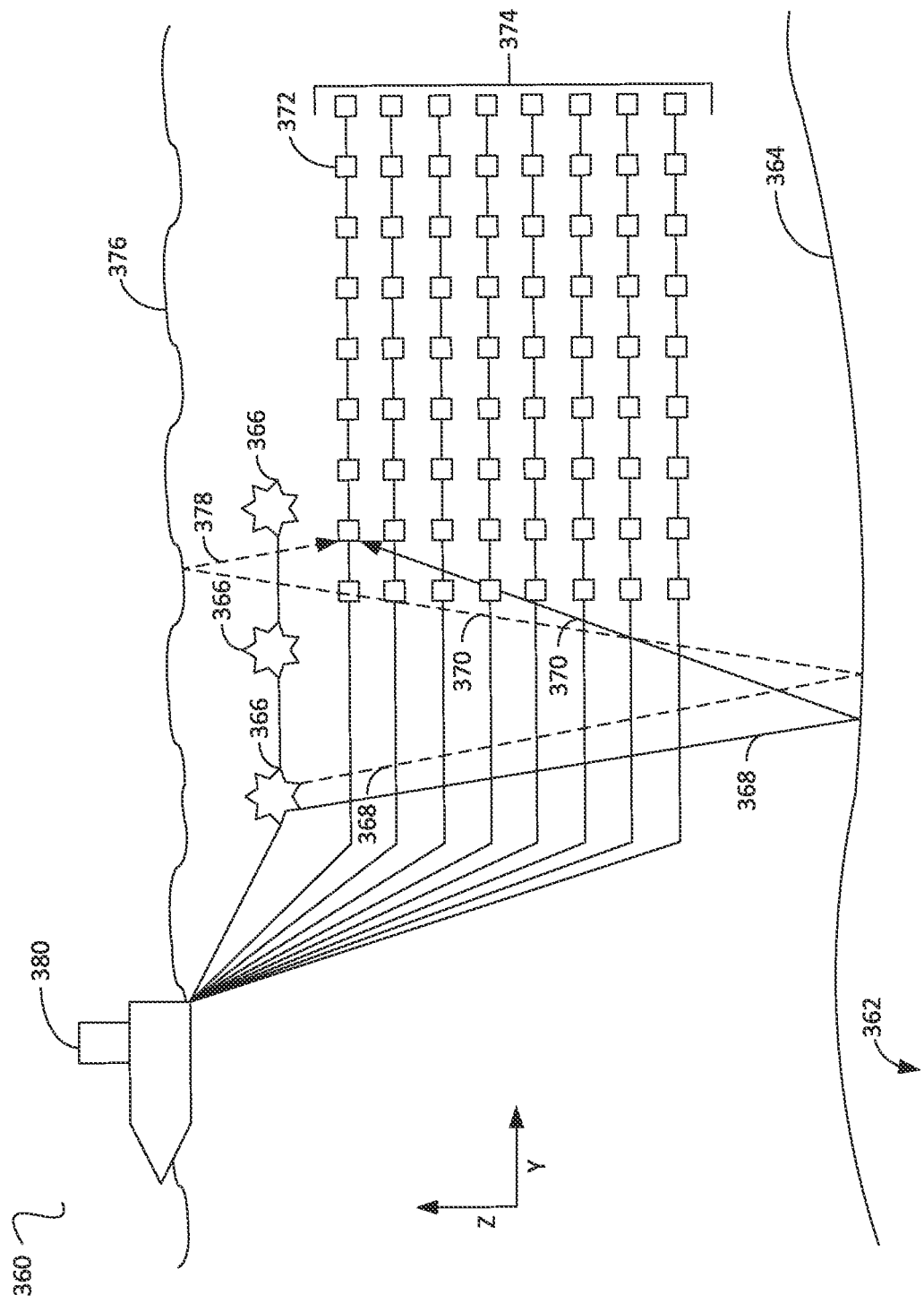

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
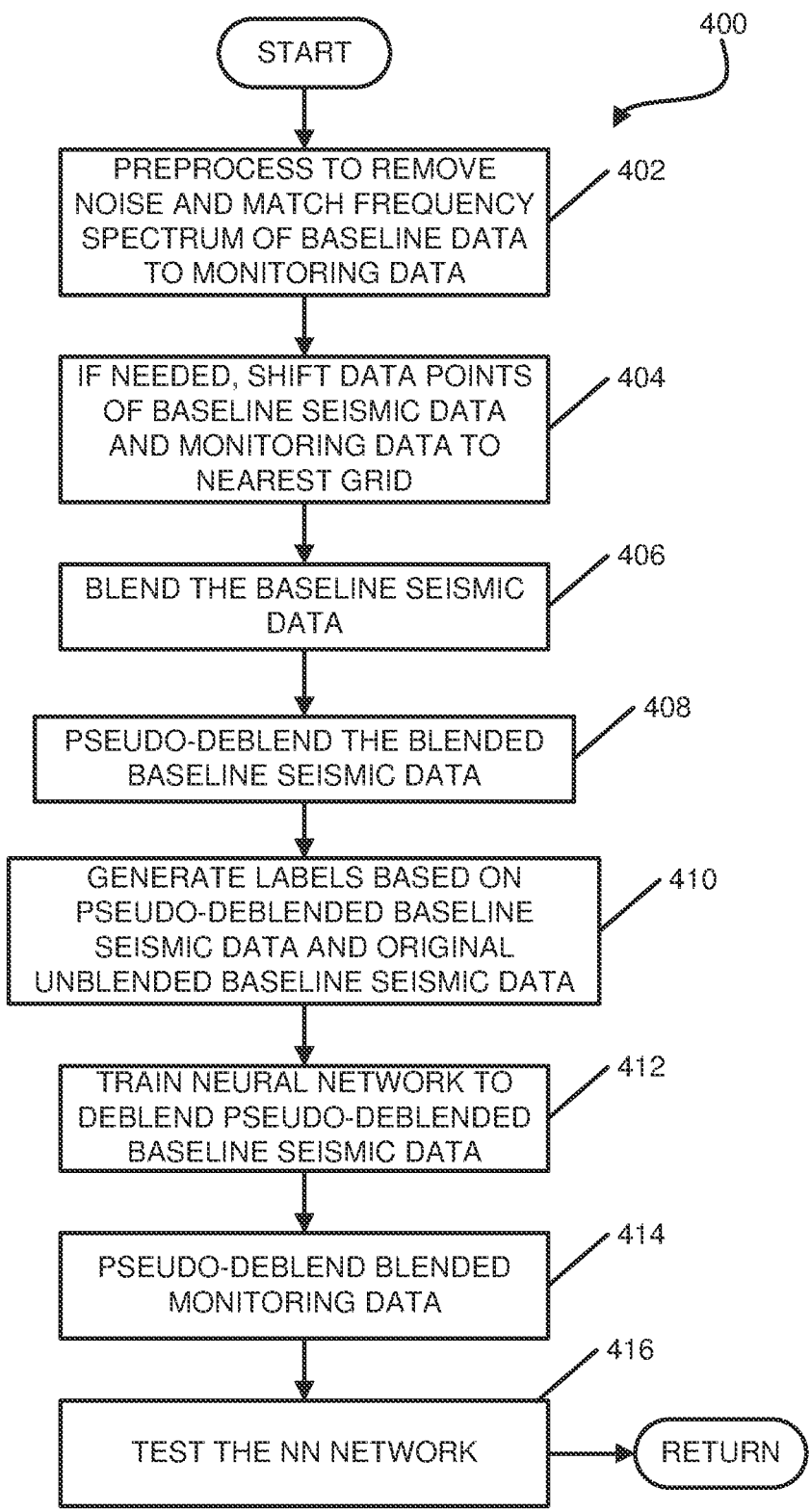
FIG. 4 illustrates a flowchart of a method for training a neural network for deblending and shot scheduling, according to an embodiment.

Referring now to FIG. 4, there is shown a flowchart of a method 400 for training a neural network for deblending and shot scheduling, e.g., for designing and implementing CO2 injection monitoring projects or other types of time lapse operations, according to an embodiment. In some embodiments, the method 400 may reduce 4D seismic acquisition time by combining the deep-learning-based simultaneous shooting schedule design with the data deblending process. Accordingly, this may reduce acquisition time through simultaneous shooting, use deep learning for deblending, recommend blending schemes (simultaneous shooting scheduling), with cost savings based on the number of shots fired simultaneously. Further, embodiments of the method 400 may be applied to various seismic acquisition survey types (e.g., marine streamer, ocean bottom nodes (OBN), land data (dynamite and vibroseis)). Further, various actions performed according to the method 400 (and any other method discussed herein) may be conducted in any order, and various aspects thereof may be combined, partitioned into two or more separate actions, performed in series or in parallel, without departing from the scope of the present disclosure.

Figure 10:
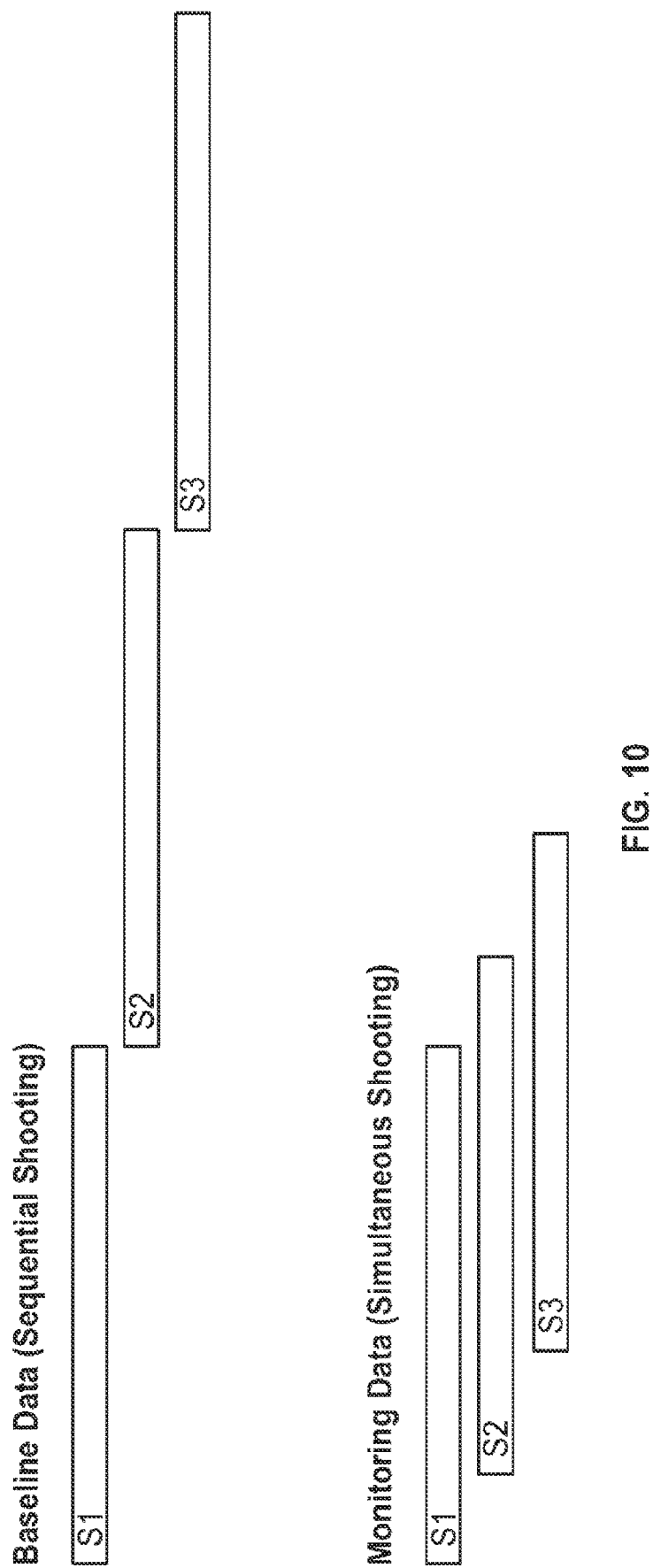
FIG. 10 illustrates a sequential shooting schedule scheme for collecting baseline seismic data and a simultaneous shooting schedule scheme for collection baseline seismic data according to an embodiment.

The method 400 may receive, as input, unblended baseline seismic data acquired using any acquisition method, and one or more blended monitoring data acquired by a simultaneous shooting acquisition method. FIG. 10 illustrates an example of such input.

A top portion of FIG. 10 shows the unblended baseline seismic data with multiple shots S1, S2, S3 occurring sequentially. After a period of time, during which effects of a shot fade, a next shot may occur, and so on.

A bottom portion of FIG. 10 shows blended monitoring data according to a simultaneous shot schedule scheme. Shortly after a first shot occurs S1, a second shot S2 occurs overlapping with S1. Next, a third shot S3 occurs overlapping with S1 and S2, and so on.

The method 400 may begin by preprocessing to remove noise (e.g., ground roll and other types of noise) and matching the frequency spectra of the baseline data and the monitoring data, as at 402. This may include spectral content matching through spectral shaping between baseline data and monitoring data, amplitude matching on baseline data, and, if baseline and monitoring data have different source and receiver geometry, shifting data points of the baseline seismic data and the monitoring data to a nearest grid so that both the baseline seismic data and the monitoring data have a same source and receiver geometry (e.g., same source spacing, same receiver spacing), as at 404. Further, various preprocessing procedures may be implemented to match the frequency spectrum of the baseline data to that of the monitoring data.

Figure 11:
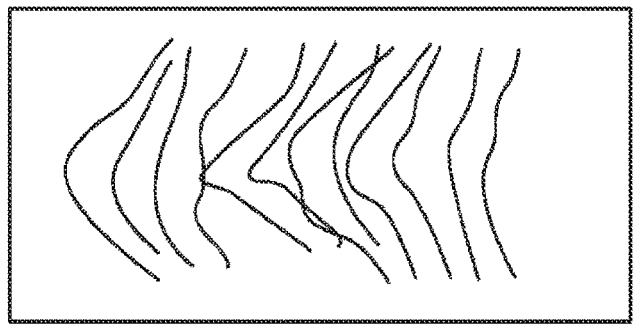
FIG. 11 shows an example of producing blended data for to be used for generating training data according to an embodiment.
Figure 11:
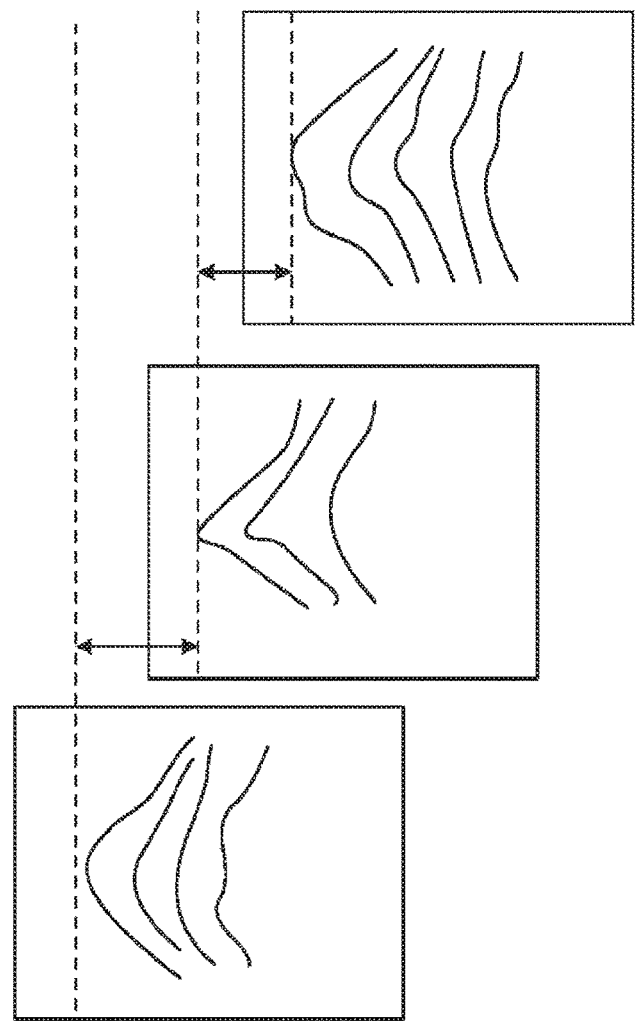

The method 400 may then include generating blended baseline seismic data by numerically blending baseline seismic data, as at 406, according to a same simultaneous blending scheme by which monitoring data is to be blended. FIG. 11 illustrates an example of data blending to generate training data. Other blending schemes may be employed to blend the baseline seismic data for the purpose of generating more training data. This process can be formulated as d=ΓD, where D represents the unblended data, d represents the blended data, and Γ represents the blending operator that contains source firing times.

Figure 12:
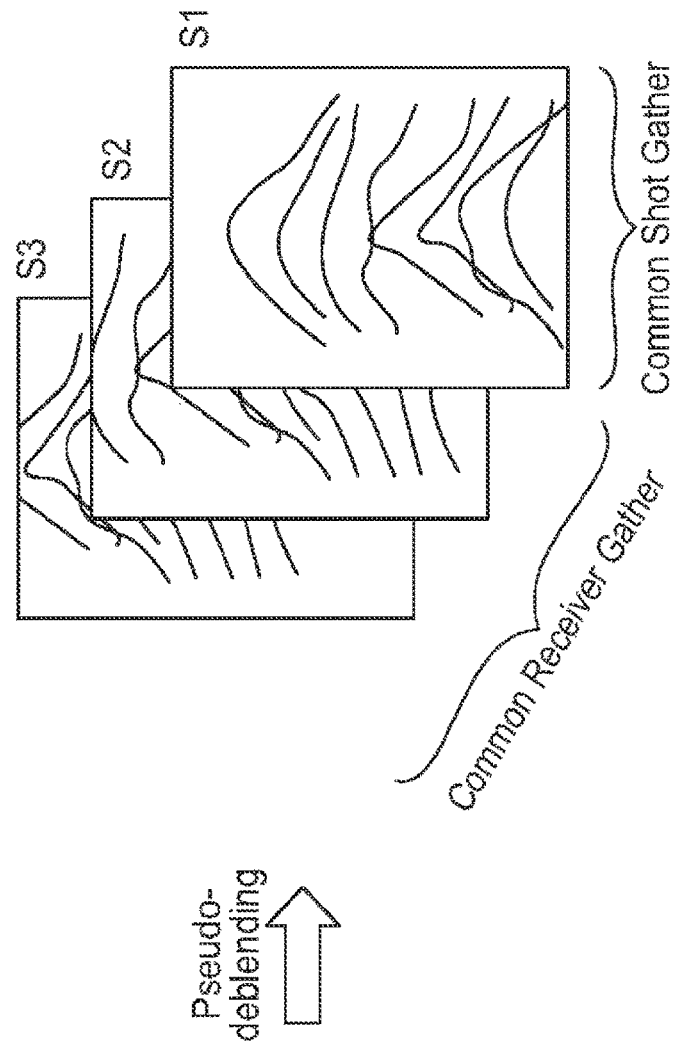
FIG. 12 shows an example of pseudo-deblending of blended data according to an embodiment.
Figure 12:
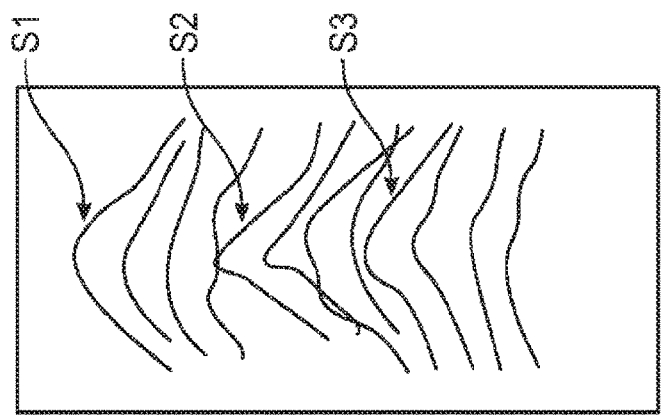

The method 400 may further include generating pseudo-deblended baseline seismic data by applying a pseudo-deblending procedure, according to any known method, to the blended baseline seismic data, as at 408. FIG. 12 illustrates an example of such pseudo-deblending. Pseudo-deblending may include applying the adjoint of the blending operator Γ to the blended baseline seismic data d. This process may be formulated as $\tilde{D}=\Gamma^T d$, where $\tilde{D}$ represents the pseudo-deblended data.

The method 400 may also include generating labels, as at 410. Label generation may include extracting one or multiple common gathers (common receiver gathers, common offset gathers, or common mid-point gathers) from the pseudo-deblended baseline data, along with corresponding original unblended common gathers (common receiver gathers, common offset gathers, or common mid-point gathers), generating multiple pairs of labels for the subsequent neural network (NN) (or any other artificial intelligence/machine learning model) training. Neural network algorithms include a convolutional neural network (CNN), a transformer, etc.

Next, the NN may be trained using the labels, the common gathers of the pseudo-deblended baseline seismic data, and the common gathers of the acquired unblended baseline seismic data to deblend common gathers of pseudo-deblended baseline seismic data, as at 412.

Figure 5:
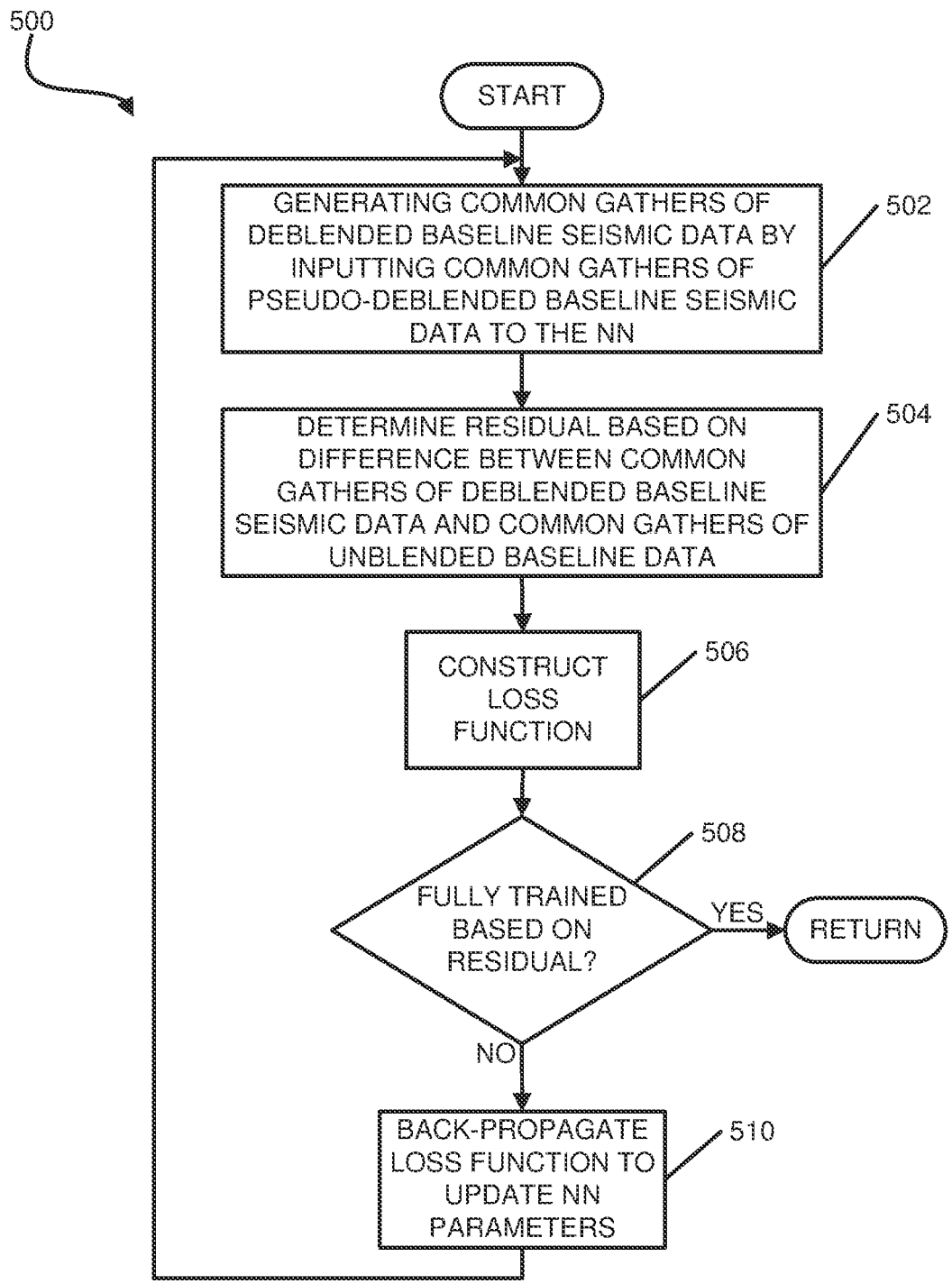
FIG. 5 illustrates a flowchart of a method for fully training a neural network, according to an embodiment.

FIG. 5 is a flowchart of an example process 500 for training the NN at 412. The process may begin by generating common gathers of deblended baseline seismic data by inputting common gathers of pseudo-deblended baseline seismic data to the NN, as at 502. Next, a residual may be determined based on a difference between the common gathers of deblended baseline seismic data and the common gathers of unblended baseline seismic data, as at 504. A loss function may be constructed at 506 and a determination may be made regarding whether the NN is fully trained based on the determined value of the residual, as at 508. For example, if the determined value of the residual converges, or stops decreasing any further, then the NN may be considered to be fully trained. If the NN is determined to be fully trained, then the process may be completed. Otherwise, a loss function may be constructed based on the residual, as at 508, and the loss function may be backpropagated to update the NN parameters, as at 510. 502-510 then may be repeated until the NN is determined to be fully trained at 506.

Figure 13:
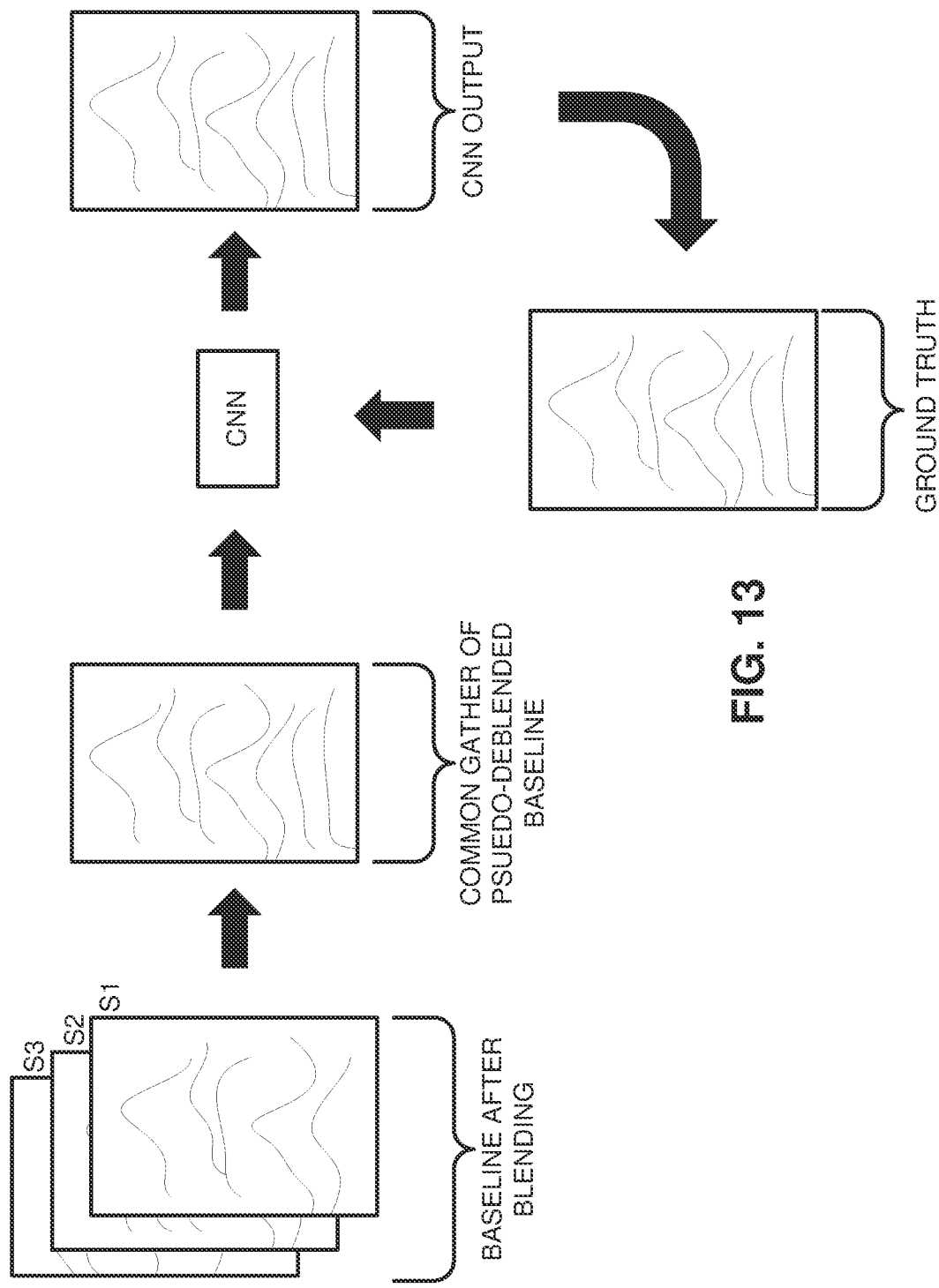
FIG. 13 illustrates training of a convolutional neural network (CNN) according to an embodiment.

FIG. 13 illustrates such training using the data and labels in a 2D network, according to an embodiment. As shown in FIG. 13, a pseudo-deblending procedure may be applied to blended baseline seismic data to produce one or more common gathers of pseudo-deblended baseline seismic data. The common gathers of the pseudo-deblended data may be input to a convolutional neural network (CNN) to produce one or more common gathers of deblended baseline seismic data as CNN output, which is compared to one or more common gathers of unblended baseline seismic data to produce a residual.

Returning to FIG. 4, after training the NN, a pseudo-deblending procedure may be applied to the monitoring data, produced according to a same simultaneous shooting schedule scheme used to blend the baseline seismic data, as at 414. The NN then may be tested, as at 416, by extracting one or more common gathers (common receiver gathers, common offset gathers, or common mid-point gathers) from the pseudo-deblended monitoring data and inputting the common gathers of the pseudo-deblended data to the trained NN to produce deblended monitoring data. The trained NN then may be employed for conducting CO2 injection and storage monitoring, or other time lapse projects, in some embodiments.

Figure 6:
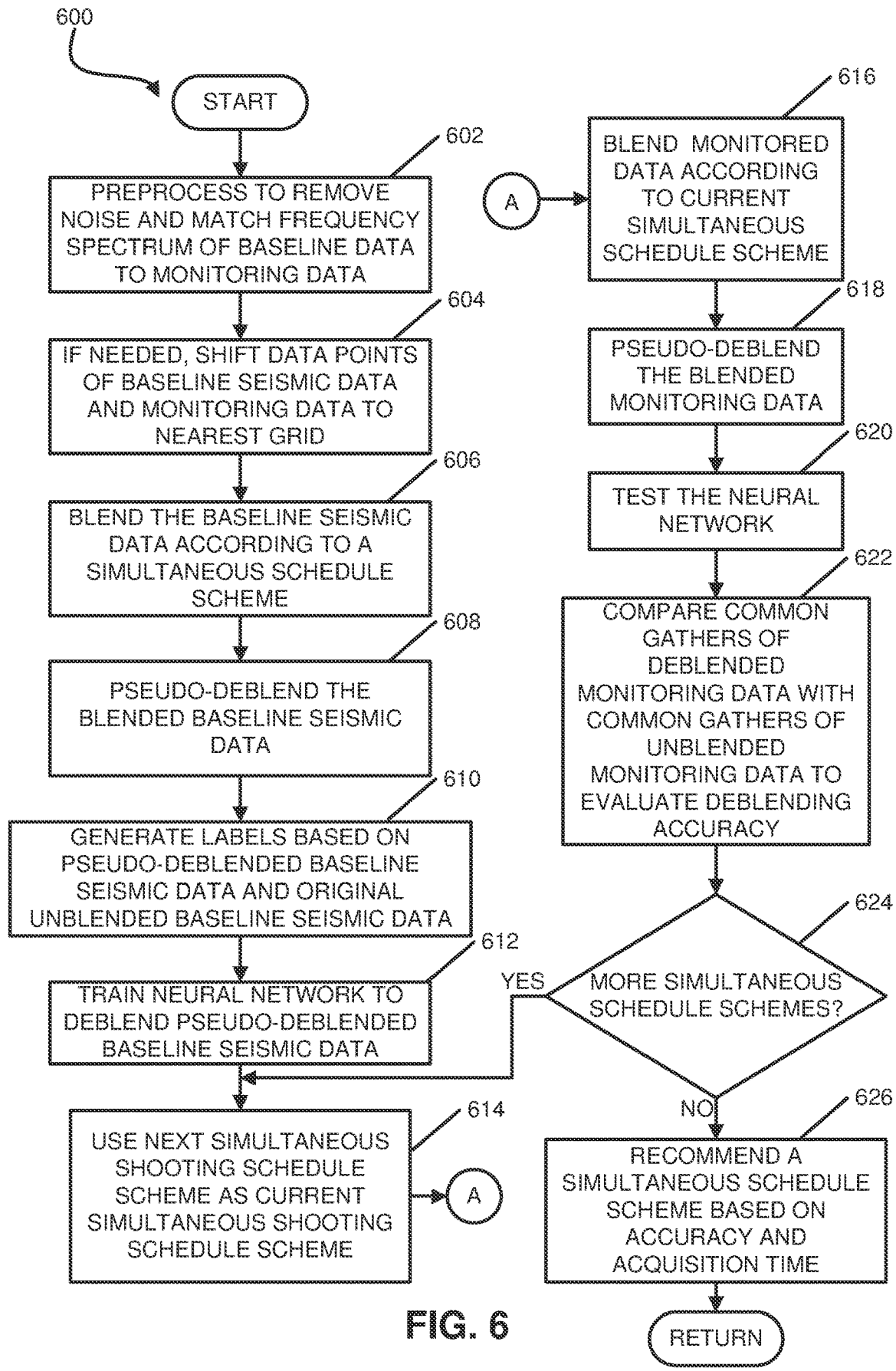
FIG. 6 illustrates a flowchart of a method for determining and providing a deep-learning-based simultaneous shooting scheduling scheme recommendation.

Embodiments of the disclosure may also include providing a deep-learning-based simultaneous shooting scheduling scheme recommendation for monitoring a seismic data acquisition survey. FIG. 6 illustrates a flowchart of a method 600 for generating such recommendations, according to an embodiment. The method may begin by preprocessing to remove noise (e.g., ground roll and other types of noises) and matching the frequency spectra of the baseline data and the monitoring data, as at 602. This may include spectral content matching through spectral shaping between baseline data and monitoring data, amplitude matching on baseline data, and, if baseline and monitoring data have different source and receiver geometry, shifting data points of the baseline seismic data and the monitoring data to a nearest grid so that both the baseline seismic data and the monitoring data have a same source and receiver geometry (e.g., same source spacing, same receiver spacing), as at 604.

The method 600 may then include numerical blending of baseline seismic data, as at 606, to produce blended baseline seismic data. In this numerical blending procedure, the blending schemes are preferred to be the same as the blending schemes of the multiple monitoring datasets that are acquired using simultaneous shooting. To generate more training data, other blending schemes can also be adopted. The method 600 may further include pseudo-deblending of the blended baseline seismic data, as at 608. The method 600 may also include generating labels, as at 610. Label generation may include extracting one or multiple common gathers (common receiver gathers, common offset gathers, or common mid-point gathers) from the pseudo-deblended baseline seismic data, along with corresponding original unblended common gathers (common receiver gathers, common offset gathers, or common mid-point gathers), generating multiple pairs of labels for the subsequent neural network (NN) (or any other artificial intelligence/machine learning model) training.

Next, the NN may be trained, as at 612. The training may be identical to the NN training described with respect to process 500 in various embodiments.

After fully training the NN, a current simultaneous shooting schedule scheme may be set to a next simultaneous shooting schedule scheme at 614 and unblended monitoring data may be blended according to the current simultaneous shooting schedule scheme 616.

Next, the blended monitoring data may be pseudo-deblended by the pseudo-deblending procedure, as at 618. The NN then may be tested by extracting one or more common gathers from the pseudo-deblended monitoring data and inputting the one or more common gathers to the fully trained NN to obtain common gathers of deblended monitoring data, as at 620. At 622, the common gathers of the deblended monitoring data may be compared with common gathers of the unblended monitoring data to evaluate deblending accuracy. For example, the comparing may include comparing the common gathers of deblended monitoring data, obtained at 620, with common gathers of unblended monitoring data.

Next, a determination may be made regarding whether there are any additional simultaneous shooting schedule schemes, as at 624. If there are additional simultaneous shooting schedule schemes, then 614-624 again may be performed.

If, at 624 a determination is made that there are no additional simultaneous shooting schedule schemes, then at least one of the simultaneous shooting schedule schemes may be recommended by the process based on having a relatively accurate deblending accuracy and a low acquisition time with respect to others of the simultaneous shooting schedule schemes, as at 626. The recommendation may be displayed on a display screen, output via a speaker, sent to a user via email or an electric message, or provided via another means.

Figure 7:
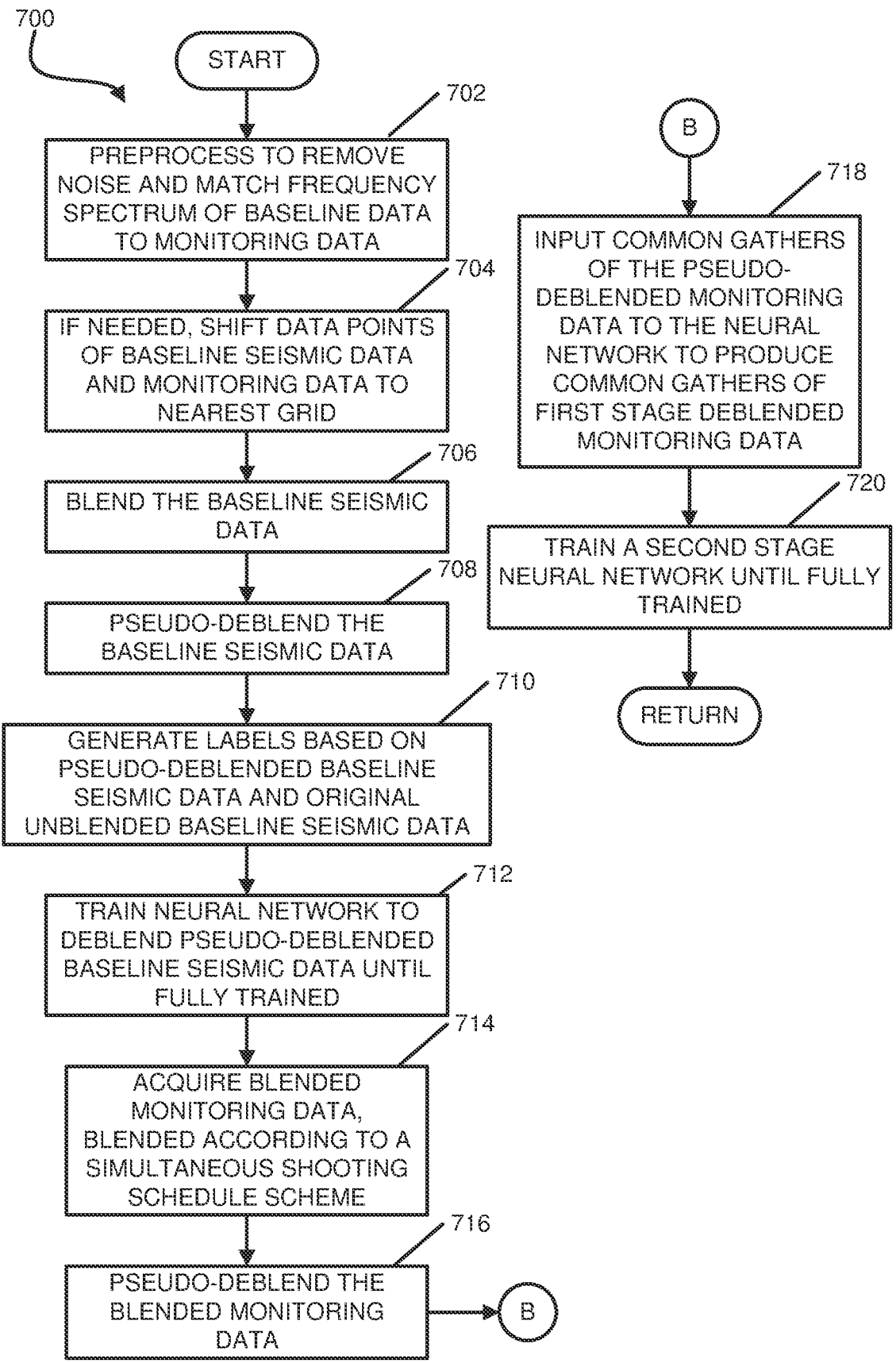
FIG. 7 illustrates a flowchart of a two stage self-supervised learning method according to an embodiment.

FIG. 7 is a flowchart of an example process 700 of a two stage self-supervised learning method that may be used in some embodiments. The process 700 may begin by preprocessing to remove noise (e.g., ground roll and other types of noises) and matching the frequency spectra of the baseline data and the monitoring data, as at 702. This may include spectral content matching through spectral shaping between baseline data and monitoring data, amplitude matching between baseline data and monitoring data, and, if baseline and monitoring data have different source and receiver geometry, shifting data points of the baseline seismic data and the monitoring data to a nearest grid so that both the baseline seismic data and the monitoring data have a same source and receiver geometry (e.g., same source spacing, same receiver spacing), as at 704.

The method 700 may then numerically blend the baseline seismic data, as at 706, and may pseudo-deblend the blended baseline seismic data, as at 708.

The method 700 may further generate labels, as at 710. Label generation may include extracting one or multiple common gathers (common receiver gathers, common offset gathers, or common mid-point gathers) from the pseudo-deblended baseline seismic data, along with corresponding original unblended common gathers (common receiver gathers, common offset gathers, or common mid-point gathers), and generating multiple pairs of labels for the subsequent neural network (NN) (or any other artificial intelligence/machine learning model) training. Neural network algorithms may include convolutional neural network (CNN), transformer, etc.

Next, the NN may be trained, as at 712. Method 500, discussed previously, may fully train the NN.

Blended monitoring data then may be acquired, wherein the monitoring data is blended according to a simultaneous shooting schedule scheme, as at 714, and is not numerically blended. The blended monitoring data may be pseudo-deblended by a pseudo-deblending procedure to produce pseudo-deblended monitoring data, as at 716. Common gathers may be extracted from the pseudo-deblended monitoring data and inputted to the fully trained NN to produce common gathers of first-stage deblended monitoring data, as at 718. A second-stage NN then may be fully trained, as at 720.

Figure 8:
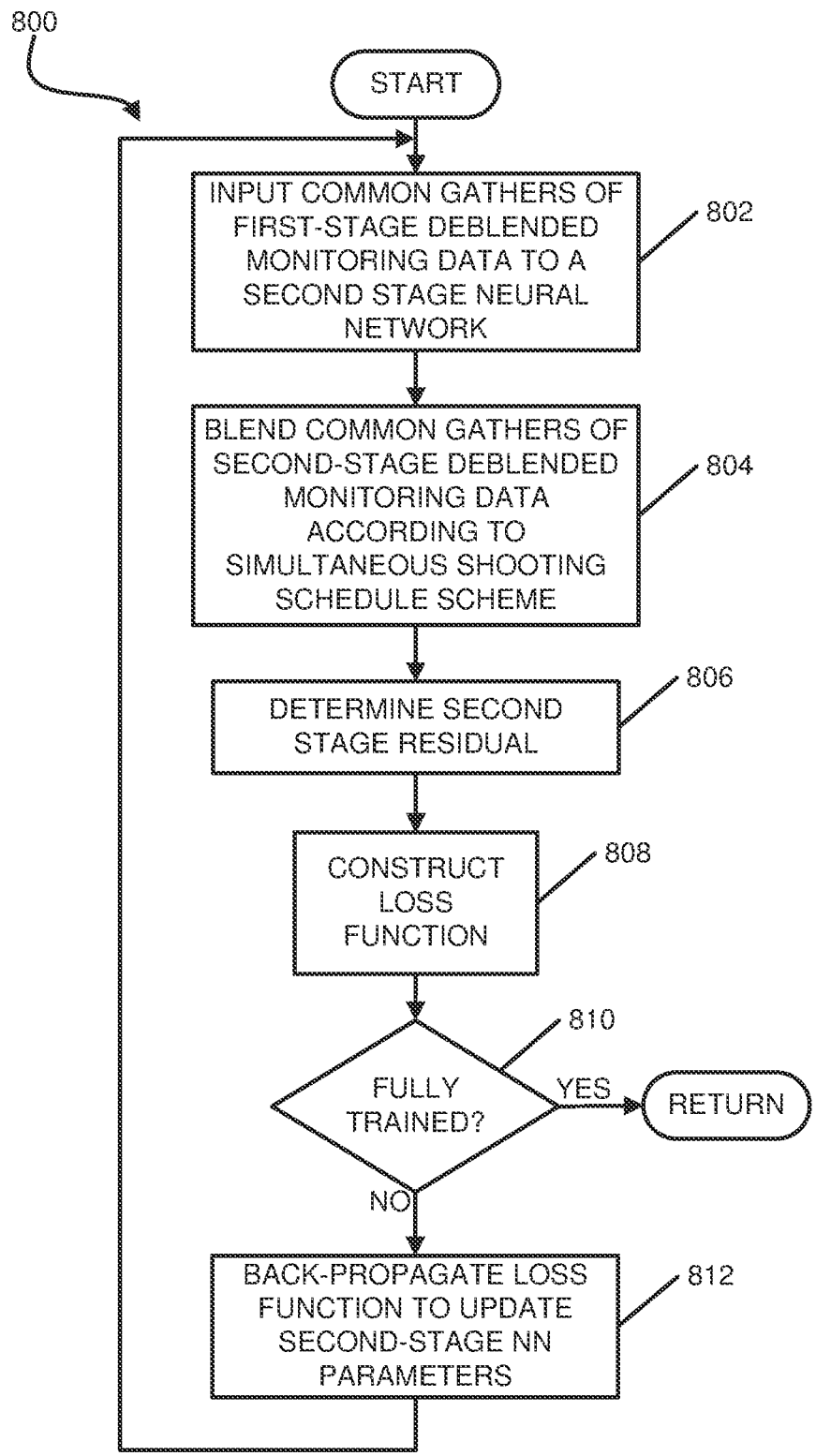
FIG. 8 shows a flowchart of a method for training a second-stage neural network used in a two stage self-supervised learning method according to an embodiment.

FIG. 8 illustrates a flowchart of a procedure 800 for training the second-stage NN. The second-stage NN may be trained and used if the first-stage NN does not meet accuracy requirements. The process may begin by inputting common gathers of the first-stage deblended monitoring data to the second-stage NN to produce common gathers of second-stage deblended monitoring data, as at 802. Next, the common gathers of the second-stage deblended monitoring data may be numerically blended according to the simultaneous shooting schedule scheme, by which the acquired monitoring data is blended according to 714, to produce common gathers of second-stage blended monitoring data, as at 804.

A second-stage residual may be determined by determining a difference between the common gathers of the second-stage blended monitoring data and the blended monitoring data acquired at 714 to produce the second-stage residual, as at 806. A second-stage loss function then may be constructed, as at 808. For example, $L=\|d_M - d_{M'}\|$, where L is loss, $d_M$ is blended monitoring data acquired in a survey, and $d_{M'}$ is a numerically blended version of the deblended monitoring data. Whether the second-stage NN is fully trained may be determined by a value of the residual, as at 810. For example, if the value of the residual converges, then the second-stage NN may be considered to be fully trained.

Figure 9:
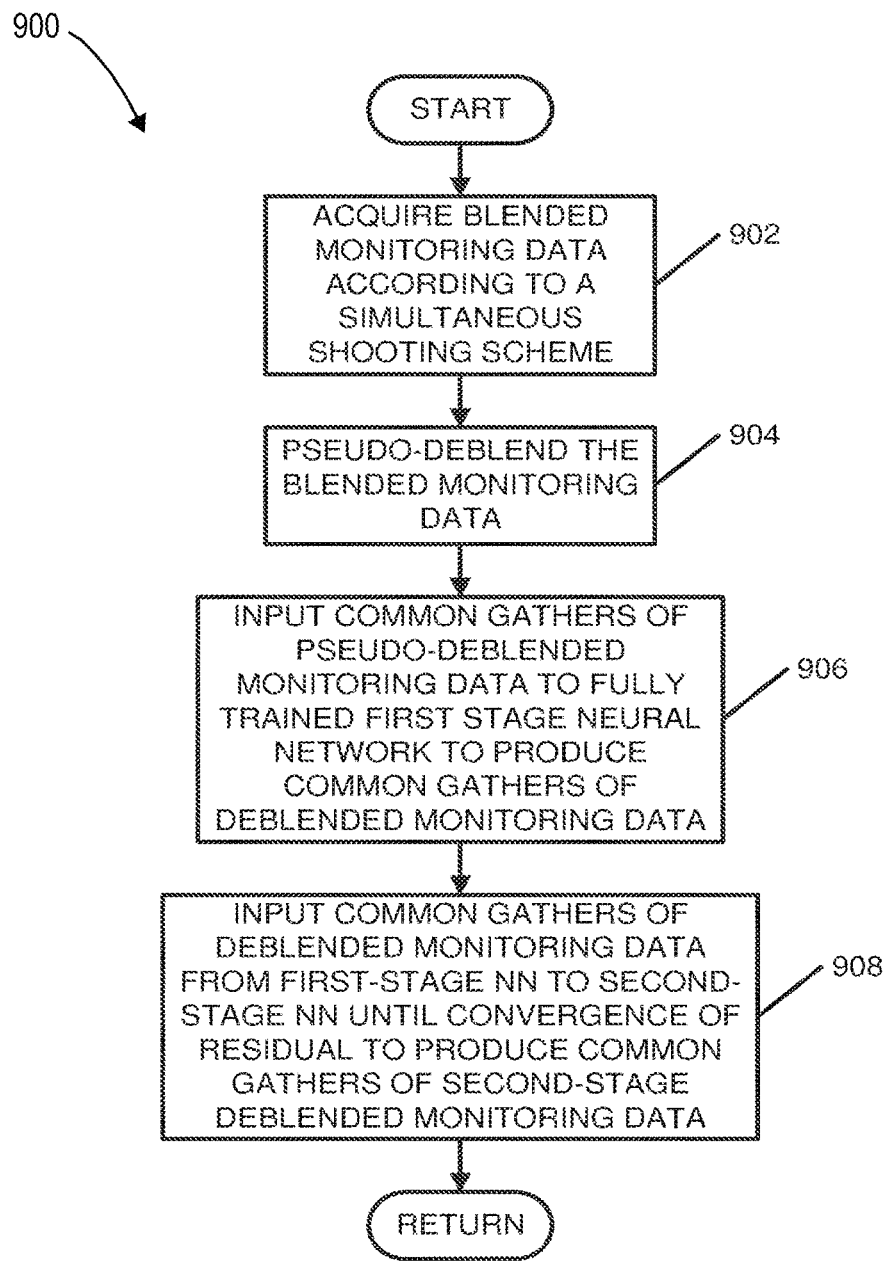
FIG. 9 shows a flowchart of a process that uses the fully trained two stage self-supervised learning method.

If, at 810, the second-stage NN is determined to be fully trained, then the process may be completed. Otherwise, the second-stage loss function may be backpropagated to update second-stage NN parameters, as at 812, and 802-812 may be repeated until the second-stage NN is fully trained. FIG. 9 illustrates a flowchart of an example procedure 900 for using the fully-trained two-stage self-learning method. The method may begin by acquiring monitoring data that is blended according to a simultaneous shooting schedule scheme, as at 902. The blended monitoring data then may be pseudo-deblended according to a pseudo-deblending procedure, as at 904. Common gathers of the pseudo-deblended monitoring data then may extracted and input to a fully trained first-stage NN to produce common gathers of deblended monitoring data, as at 906. The common gathers of the deblended monitoring data then may be input to a second-stage NN until convergence of a second-stage residual to produce more accurate common gathers of second-stage-deblended monitoring data by training the second-stage NN, as at 908. The common gathers of the second-stage deblended monitoring data may be included in collected survey data.

Figure 14:
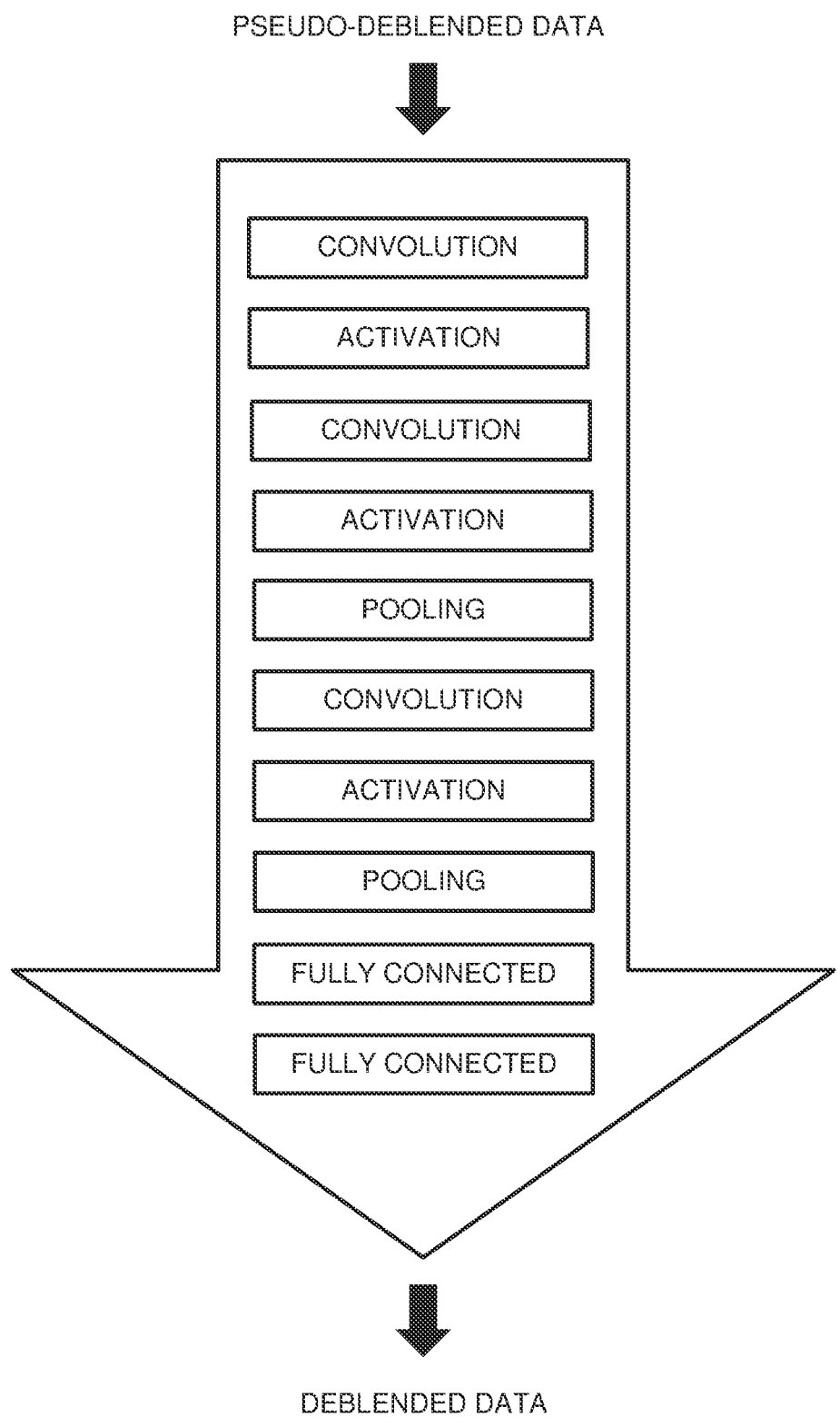
FIG. 14 shows layers included in an example convolutional network according to an embodiment.

FIG. 14 shows an example convolutional neural network (CNN) that may be used with various embodiments. The CNN may receive pseudo-deblended data as input and may produce corresponding deblended data as output. The CNN may include multiple convolution layers followed by respective activation layers. A pooling layer may follow a second and third activation layers. A last two layers of the CNN may be fully connected layers.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 15:
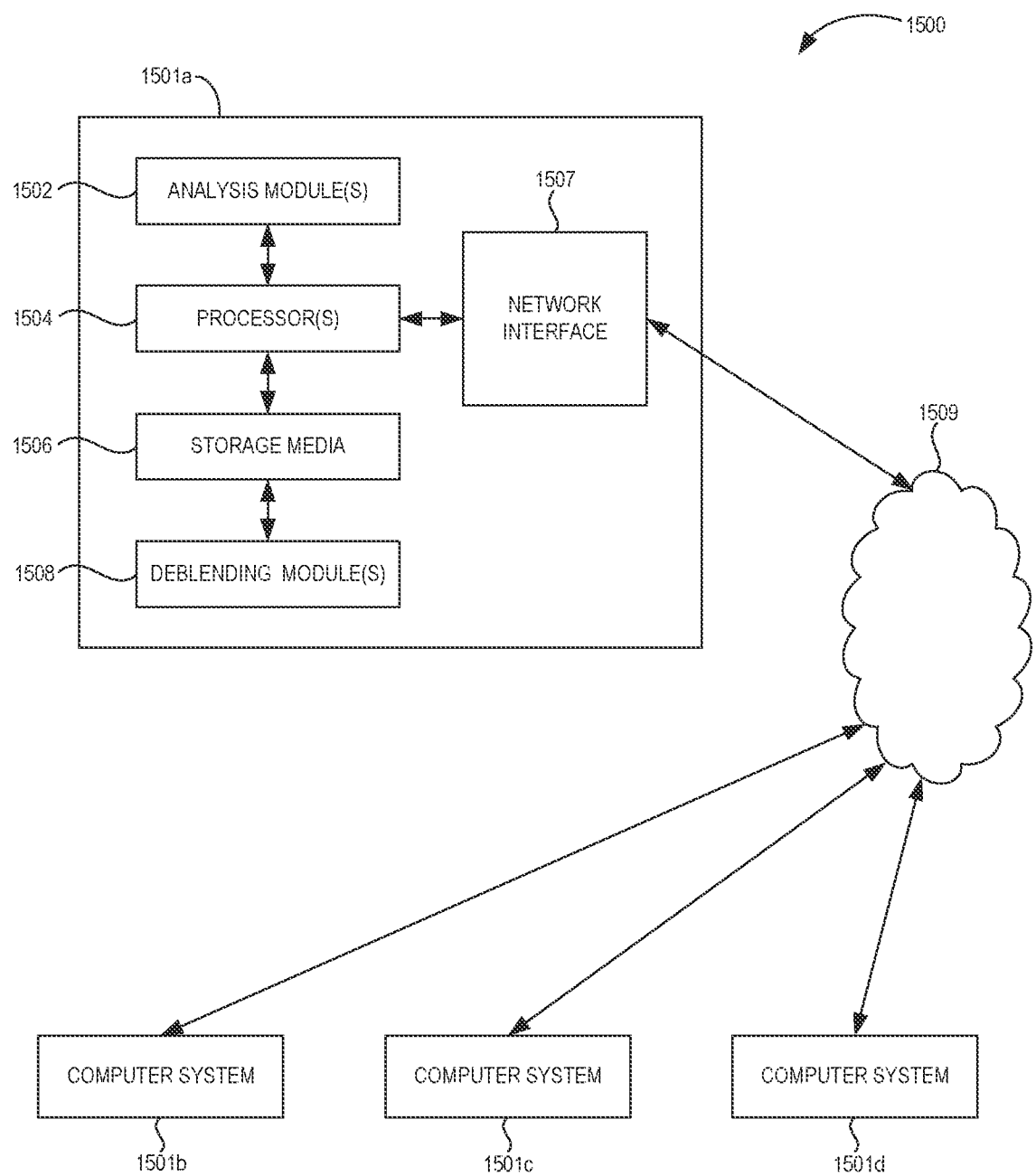
FIG. 15 illustrates a schematic view of a computing system, according to an embodiment.

In some embodiments, any of the methods of the present disclosure may be executed using a system, such as a computing system. FIG. 15 illustrates an example of such a computing system 1500, in accordance with some embodiments. The computing system 1500 may include a computer or computer system 1501a, which may be an individual computer system 1501a or an arrangement of distributed computer systems. The computer system 1501a includes one or more analysis module(s) 1502 configured to perform various tasks according to some embodiments, such as one or more methods disclosed herein. To perform these various tasks, the analysis module 1502 executes independently, or in coordination with, one or more processors 1504, which is (or are) connected to one or more storage media 1506. The processor(s) 1504 is (or are) also connected to a network interface 1507 to allow the computer system 1501a to communicate over a data network 1509 with one or more additional computer systems and/or computing systems, such as 1501b, 1501c, and/or 1501d (note that computer systems 1501b, 1501c and/or 1501d may or may not share the same architecture as computer system 1501a, and may be located in different physical locations, e.g., computer systems 1501a and 1501b may be located in a processing facility, while in communication with one or more computer systems such as 1501c and/or 1501d that are located in one or more data centers, and/or located in varying countries on different continents).

A processor can include a microprocessor, microcontroller, processor module or subsystem, programmable integrated circuit, programmable gate array, or another control or computing device.

The storage media 1506 can be implemented as one or more computer-readable or machine-readable storage media. Note that while in the example embodiment of FIG. 15 storage media 1506 is depicted as within computer system 1501a, in some embodiments, storage media 1506 may be distributed within and/or across multiple internal and/or external enclosures of computing system 1501a and/or additional computing systems. Storage media 1506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1500 contains one or more deblending module(s) 1508. In the example of computing system 1500, computer system 1501a includes the deblending module 1508. In some embodiments, a single deblending module may be used to perform some or all aspects of one or more embodiments of the methods. In alternate embodiments, a plurality of deblending modules may be used to perform some or all aspects of methods.

It should be appreciated that computing system 1500 is only one example of a computing system, and that computing system 1500 may have more or fewer components than shown, may combine additional components not depicted in the example embodiment of FIG. 15, and/or computing system 1500 may have a different configuration or arrangement of the components depicted in FIG. 15. The various components shown in FIG. 15 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1500, FIG. 15), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for deblending of simultaneous source monitoring of seismic data in a time lapse seismic application, comprising:
  acquiring unblended baseline seismic data;
  generating blended baseline seismic data by numerically blending the unblended baseline seismic data according to a simultaneous shooting schedule scheme;
  generating pseudo-deblended baseline seismic data by applying a pseudo-deblending procedure to the blended baseline seismic data;

generating labels for machine learning from common gathers of the pseudo-deblended baseline seismic data and common gathers of the acquired unblended baseline seismic data;

training a neural network using the labels, the common gathers of the pseudo-deblended baseline seismic data, and the common gathers of the acquired unblended baseline seismic data, the neural network being trained to produce common gathers of deblended seismic data from the common gathers of the pseudo-deblended baseline seismic data; and performing a drilling operation in accordance with the common gathers of the deblended seismic data produced by the trained neural network, wherein the simultaneous shooting schedule scheme comprises firing a plurality of shots such that subsequent shots are fired before effects of a previous shot fade.

2. The method of claim 1, further comprising:

repeating for each of a plurality of second simultaneous shooting schedule schemes:

acquiring unblended monitoring data;

generating blended monitoring data by numerically blending the unblended monitoring data according to a respective one of the plurality of the second simultaneous shooting schedule schemes;

generating pseudo-deblended monitoring data by applying the pseudo-deblending procedure to the blended monitoring data;

generating common gathers of deblended monitoring data by inputting common gathers of the pseudo-deblended monitoring data to a neural network trained to produce the common gathers of the deblended monitoring data based on the respective one of the plurality of the second simultaneous shooting schedule schemes; and comparing the common gathers of the deblended monitoring data with common gathers of the unblended monitoring data to evaluate deblending accuracy of the neural network trained to produce the common gathers of the deblended monitoring data based on the respective one of the plurality of the second simultaneous shooting schedule schemes; and recommending one of the plurality of second simultaneous shooting schedule schemes based on accuracy and acquisition time.

3. The method of claim 2, further comprising preprocessing the unblended baseline seismic data to remove noise and to match a frequency spectrum of the unblended baseline seismic data to that of the unblended monitoring data.

4. The method of claim 3, wherein the preprocessing of the unblended baseline seismic data further comprises shifting data points of the unblended baseline seismic data and the unblended monitoring data to a nearest grid so that both the unblended baseline seismic data and the unblended monitoring data have a same source geometry and a same receiver geometry.

5. The method of claim 1, further comprising:

acquiring blended monitoring data that is blended according to the simultaneous shooting schedule scheme;

generating pseudo-deblended monitoring data by applying the pseudo-deblending procedure to the blended monitoring data;

generating common gathers of first-stage deblended monitoring data by inputting common gathers of the pseudo-deblended monitoring data to the trained neural network; and training a second-stage neural network, the second-stage neural network being trained to produce common gathers of second-stage deblended monitoring data from the common gathers of the first-stage deblended monitoring data.

6. The method of claim 5, further comprising:

acquiring second monitoring data produced by the simultaneous shooting schedule scheme;

generating pseudo-deblended second monitoring data by applying the pseudo-deblending procedure to the second monitoring data;

generating common gathers of first-stage deblended second monitoring data by inputting common gathers of the pseudo-deblended second monitoring data to the neural network; and generating common gathers of second-stage deblended second monitoring data by inputting the common gathers of the first-stage deblended second monitoring data to the second-stage neural network, the common gathers of the second-stage deblended second monitoring data being included in collected survey data.

7. A computing system, comprising:

at least one processor; and a memory comprising at least one non-transitory, computer-readable medium storing instructions that, when executed by at least one of the at least one processor, cause the computing system to perform operations comprising:

acquiring blended monitoring data, the blended monitoring data being blended according to a simultaneous shooting schedule scheme;

generating pseudo-deblended monitoring data by applying a pseudo-deblending procedure to the blended monitoring data;

generating common gathers of deblended monitoring data by inputting common gathers of the pseudo-deblended monitoring data to a neural network trained to produce the common gathers of the deblended monitoring data from the common gathers of the pseudo-deblended monitoring data produced from the blended monitoring data blended according to the simultaneous shooting schedule scheme; and the at least one processor sending a signal to a controller to cause a drilling tool to start performing a drilling operation in accordance with common gathers of deblended seismic data produced by the trained neural network, wherein the simultaneous shooting schedule scheme comprises firing a plurality of shots such that subsequent shots are fired before effects of a previous shot fade.

8. The computing system of claim 7, further comprising generating common gathers of second-stage deblended monitoring data by inputting the common gathers of the deblended monitoring data to a second-stage neural network.

9. The computing system of claim 7, wherein the operations further comprise:

acquiring unblended baseline seismic data;

generating blended baseline seismic data by numerically blending the unblended baseline seismic data according to the simultaneous shooting schedule scheme to produce the blended baseline seismic data;

generating pseudo-deblended baseline seismic data by applying a pseudo-deblending procedure to the blended baseline seismic data;

generating labels for machine learning from common gathers of the pseudo-deblended baseline seismic data and common gathers of the acquired unblended seismic data; and training a neural network using the labels, the common gathers of the pseudo-deblended baseline seismic data, and the common gathers of the acquired unblended baseline seismic data, the neural network being trained to produce common gathers of deblended baseline seismic data from the common gathers of the pseudo deblended baseline seismic data.

10. The computing system of claim 9, wherein the training the neural network comprises:

generating the common gathers of the deblended baseline seismic data by inputting the common gathers of the pseudo-deblended baseline seismic data into the neural network;

determining a residual based on a difference between the produced common gathers of the deblended baseline seismic data and the common gathers of the acquired unblended baseline seismic data;

constructing a loss function based on the residual; and backpropagating the loss function to update parameters of the neural network.

11. The computing system of claim 10, wherein the operations further comprise:

repeating for each second simultaneous shooting scheme of a plurality of second simultaneous shooting schemes:

acquiring unblended monitoring data;

generating blended monitoring data by numerically blending the unblended monitoring data according to a respective one of the plurality of second simultaneous shooting schemes;

generating pseudo-deblended monitoring data by applying the pseudo-deblending procedure to the blended monitoring data;

generating common gathers of the deblended monitoring data by inputting common gathers of the pseudo-deblended monitoring data to a neural network trained to produce the common gathers of the deblended monitoring data based on the respective one of the plurality of second simultaneous shooting schemes; and comparing the common gathers of the deblended monitoring data with common gathers of the unblended monitoring data to evaluate deblending accuracy of the neural network trained to produce the common gathers of the deblended monitoring data based on the respective one of the plurality of second simultaneous shooting schedule schemes; and recommending one of the plurality of second simultaneous shooting schedule schemes based on accuracy and acquisition time.

12. The computing system of claim 11, wherein the operations further comprise preprocessing the unblended baseline seismic data to remove noise and to match a frequency spectrum of the unblended baseline seismic data to that of the unblended monitoring data.

13. The computing system of claim 12, wherein the preprocessing of the unblended baseline seismic data further comprises shifting data points of the unblended baseline seismic data and the unblended monitoring data to a nearest grid so that both the unblended baseline seismic data and the unblended monitoring data have a same source/receiver geometry.

14. The computing system of claim 9, wherein the operations further comprise:

training a second-stage neural network, the training of the second-stage neural network comprising:

generating common gathers of second-stage deblended monitoring data by inputting the common gathers of the deblended monitoring data to the second-stage neural network;

generating common gathers of second-stage re-blended monitoring data by blending the common gathers of the second-stage deblended monitoring data according to the simultaneous shooting schedule scheme;

determining a second-stage residual based on a second-stage difference between the common gathers of the second-stage re-blended monitoring data and common gathers of the blended monitoring data; and determining whether the training of the second-stage neural network is complete based on the second-stage residual.

15. The computing system of claim 14, wherein the operations further comprise:

acquiring second monitoring data produced by the simultaneous shooting schedule scheme;

generating pseudo-deblended second monitoring data by applying the pseudo-deblending procedure to the second monitoring data;

generating common gathers of first-stage deblended second monitoring data by inputting common gathers of the pseudo-deblended second monitoring data to the neural network; and generating common gathers of second-stage deblended second monitoring data by inputting the common gathers of the first-stage deblended second monitoring data to the second-stage neural network, the common gathers of the second-stage deblended second monitoring data being included in collected survey data.

16. A non-transitory computer-readable medium having instructions for at least one processor stored thereon such that, when the at least one processor executes the instructions, the at least one processor performs operations comprising:

acquiring unblended baseline seismic data;

generating blended baseline seismic data by numerically blending the unblended baseline seismic data according to a simultaneous shooting schedule scheme to produce blended baseline seismic data;

generating pseudo-deblended baseline seismic data by applying a pseudo-deblending procedure to the blended baseline seismic data;

generating labels for machine learning from common gathers of the pseudo-deblended baseline seismic data and common gathers of the acquired unblended seismic data;

training a neural network using the labels, the common gathers of the pseudo-deblended baseline seismic data, and the common gathers of the acquired unblended baseline seismic data, the neural network being trained to produce common gathers of deblended seismic data from the common gathers of the pseudo deblended baseline seismic data; and the at least one processor sending a signal to a controller to cause a drilling tool to start performing a drilling operation in accordance with the common gathers of deblended seismic data produced by the trained neural network, wherein the simultaneous shooting schedule scheme comprises firing a plurality of shots such that subsequent shots are fired before effects of a previous shot fade.

17. The non-transitory computer-readable medium of claim 16, wherein the operations further comprise:
   repeating for each of a plurality of second simultaneous shooting schemes:
      acquiring unblended monitoring data;
      generating blended monitoring data by numerically blending the unblended monitoring data according to a respective one of the plurality of second simultaneous shooting schemes;
      generating pseudo-deblended monitoring data by applying the pseudo-deblending procedure to the blended monitoring data;
      generating common gathers of deblended monitoring data by inputting common gathers of the pseudo-deblended monitoring data to a neural network trained to produce the common gathers of the deblended monitoring data based on the respective one of the plurality of the second simultaneous shooting schemes; and
      comparing the common gathers of the deblended monitoring data with common gathers of the unblended monitoring data to evaluate deblending accuracy of the neural network trained to produce common gathers of the deblended monitoring data based on the respective one of the plurality of the second simultaneous shooting schemes; and
   recommending one of the plurality of second simultaneous shooting schedule schemes based on accuracy and acquisition time.

18. The non-transitory computer-readable medium of claim 17, wherein the operations further comprise shifting data points of the unblended baseline seismic data and the unblended monitoring data to a nearest grid so that both the unblended baseline seismic data and the unblended monitoring data have a same source/receiver geometry.

19. The non-transitory computer-readable medium of claim 16, wherein the operations further comprise:
   acquiring blended monitoring data, the blended monitoring data being blended according to the simultaneous shooting schedule scheme;
   generating pseudo-deblended monitoring data by applying the pseudo-deblending procedure to the blended monitoring data;
   generating common gathers of first-stage deblended monitoring data by inputting the common gathers of the pseudo-deblended monitoring data to the trained neural network; and
   training a second-stage neural network.

20. The non-transitory computer-readable medium of claim 19, wherein the operations further comprise:
   acquiring second monitoring data produced by the simultaneous shooting schedule scheme;
   generating pseudo-deblended second monitoring data by applying the pseudo-deblending procedure to the second monitoring data;
   generating common gathers of first-stage deblended second monitoring data by inputting common gathers of the pseudo-deblended second monitoring data to the neural network; and
   generating common gathers of second-stage deblended second monitoring data by inputting the common gathers of the first-stage deblended second monitoring data to the second-stage neural network, the common gathers of the second-stage deblended second monitoring data being included in collected survey data.

* * * * *